United States Patent
Merten et al.

(10) Patent No.: US 12,179,202 B2
(45) Date of Patent: Dec. 31, 2024

(54) MICROFLUIDIC SORTING DEVICES AND METHODS

(71) Applicant: European Molecular Biology Laboratory, Heidelberg (DE)

(72) Inventors: Christoph A. Merten, Heidelberg (DE); Daniel Frenzel, Kemberg (DE)

(73) Assignee: EUROPEAN MOLECULAR BIOLOGY LABORATORY, Heidelberg (DE)

( * ) Notice: Subject to any disclaimer, the term of this patent is extended or adjusted under 35 U.S.C. 154(b) by 44 days.

(21) Appl. No.: 18/050,316

(22) Filed: Oct. 27, 2022

(65) Prior Publication Data

US 2023/0321658 A1 Oct. 12, 2023

Related U.S. Application Data

(62) Division of application No. 16/334,953, filed as application No. PCT/EP2017/073775 on Sep. 20, 2017, now Pat. No. 11,524,294.

(30) Foreign Application Priority Data

Sep. 20, 2016 (EP) .................... 16189768

(51) Int. Cl.
- *B01L 3/00* (2006.01)
- *B03C 5/02* (2006.01)
- *G01N 15/00* (2024.01)
- *G01N 15/10* (2024.01)
- *G01N 15/149* (2024.01)

(52) U.S. Cl.
CPC ........ *B01L 3/502761* (2013.01); *B03C 5/026* (2013.01); *B01L 2200/0652* (2013.01); *B01L 2200/143* (2013.01); *B01L 2300/0861* (2013.01); *B01L 2300/0864* (2013.01); *B01L 2400/0424* (2013.01); *B03C 2201/26* (2013.01); *G01N 2015/0038* (2013.01); *G01N 2015/1006* (2013.01); *G01N 2015/1028* (2024.01); *G01N 15/149* (2024.01)

(58) Field of Classification Search
CPC ....... B01L 3/502761; B01L 2200/0652; B01L 2200/143; B01L 2300/0861; B01L 2300/0864; B01L 2400/0424; B03C 5/026; B03C 2201/26; G01N 2015/1028; G01N 15/149; G01N 2015/0038; G01N 2015/1006

See application file for complete search history.

(56) References Cited

U.S. PATENT DOCUMENTS

| | | | |
|---|---|---|---|
| 6,596,143 | B1 | 7/2003 | Wang et al. |
| 11,524,294 | B2 * | 12/2022 | Merten ............ B01L 3/502761 |
| 2005/0061714 | A1 | 3/2005 | Sibbett et al. |

(Continued)

OTHER PUBLICATIONS

International Search Report and Written Opinion, International Patent Application No. PCT/EP2017/073775, Nov. 23, 2017 (13 pages).

*Primary Examiner* — Brian J. Sines
(74) *Attorney, Agent, or Firm* — Merchant & Gould P.C.

(57) ABSTRACT

The present invention relates to the field of microfluidics and in particular to devices and methods for sorting objects in microfluidic channels. These devices and methods allow for fast and robust sorting in two-way and multi-way setups. They also enable sorting over extended periods of time.

20 Claims, 8 Drawing Sheets

(56) References Cited

U.S. PATENT DOCUMENTS

Figure 1:
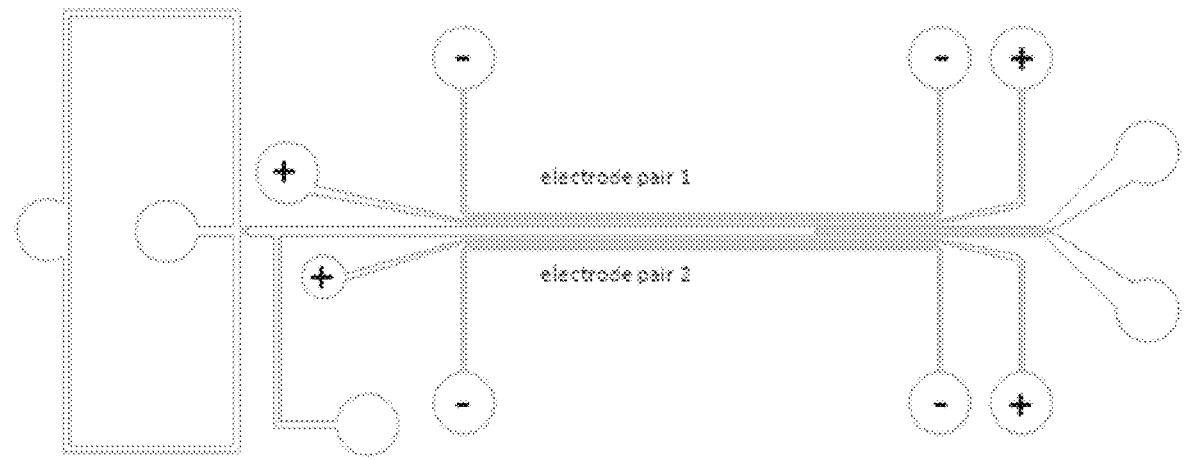
Figure 1:
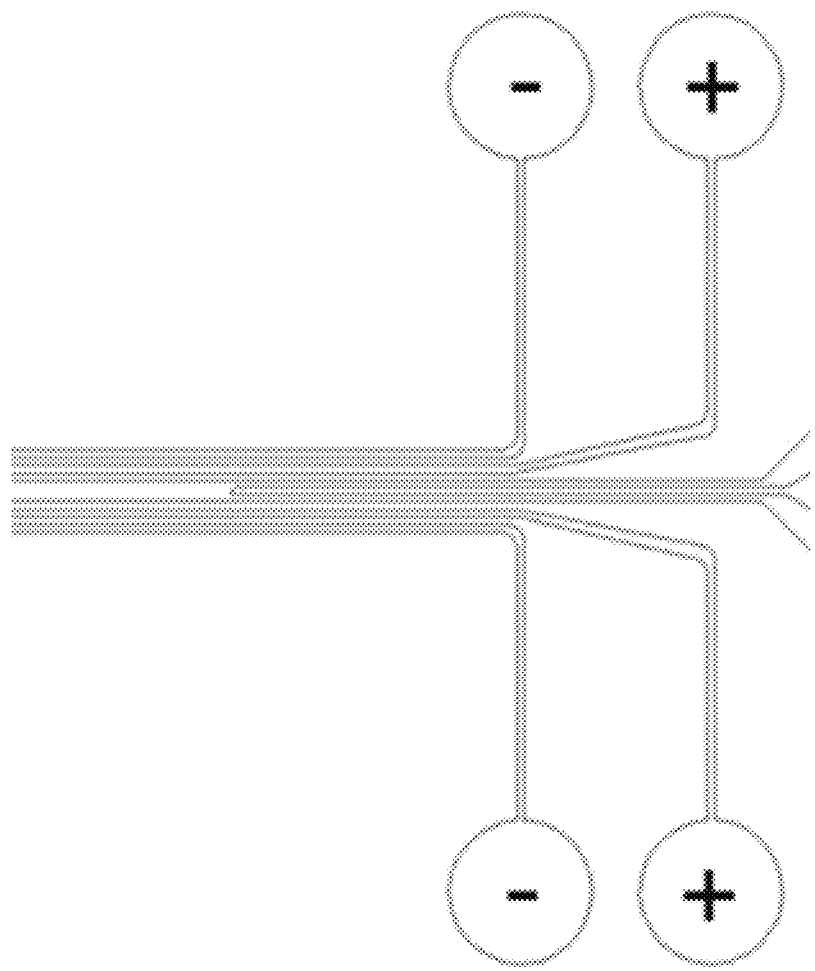

2012/0298511 A1   11/2012   Yamamoto
2013/0210639 A1     8/2013   Link et al.
2017/0304818 A1   10/2017   Brown
2019/0262834 A1     8/2019   Merten \* cited by examiner

A

B

A

B

A

B

MICROFLUIDIC SORTING DEVICES AND METHODS

FIELD OF THE INVENTION

The present invention relates to the field of microfluidics and in particular to devices and methods for sorting objects in microfluidic channels. These devices and methods allow for fast and robust sorting in two-way and multi-way setups. They also enable sorting over extended periods of time.

BACKGROUND OF THE INVENTION

Droplet based microfluidics holds great potential for high throughput screening applications. One of its key advantages is the fact that entire assay vessels containing soluble molecules can be sorted according to a desired readout (e.g. a fluorescence signal), rather than just cells or other solid particles as in a FACS sorter. This has been exploited in manifold applications such as antibody and drug screening and directed evolution (El Debs et al., Proc Natl Acad Sci USA, 2012. 109(29): p. 11570-5; Agresti et al., Proc Natl Acad Sci USA, 2010. 107(9): p. 4004-4009; Mazutis et al., Nature Protocols, 2013. 8(5): p. 870-891). Microfluidic droplet sorting is usually based on dielectrophoresis and enables the manipulation of samples at up to kilohertz frequencies (Vyawahare et al., Chem Biol, 2010. 17(10): p. 1052-65; Hu et al., Lab on a Chip, 2015. 15(20): p. 3989-3993). The typical sorting setup (FIG. 2) consists of a sorting junction where in absence of any electric field all droplets are sent to the waste. This can be achieved by using a collection channel with a higher hydrodynamic resistance than the waste channel, or by simply aspirating an asymmetric fraction of the total flow from one of the two channels (e.g. using a syringe pump in the refill mode to aspirate 70% of the total flow from the waste outlet). To collect a specific droplet, electrodes (located on the side of the collection channel) are switched on, thus pulling the desired droplet into the hydrodynamically less favoured collection channel. This sorting approach has been used in academic labs and commercial companies (such as Sphere Fluidics and HifiBio) for more than ten years now. Nonetheless it has two inevitable limitations: first of all the approach is very sensitive to minor variations in the fluid flow and the resistance of individual channel sections. For example, the frequently observed pulsing of syringe pumps (having threads which on the microscale cannot be rotated at a 100% constant speed) can push non-selected droplets into the collection channel. Similarly, deposits in the channels (e.g. a dust particle or protein precipitate in the waste channel) can change the fluidic resistance so that undesired droplets are collected. In consequence it is still very difficult to run microfluidic droplet sorting experiments stably over several hours (as required for screening applications) without collecting false positives. Another limitation of dielectrophoretic sorting devices is the fact that they hardly allow to sort individual droplets into more than two channels, to the best of our knowledge this has never been shown. This is a significant disadvantage, since multi-way sorting has tremendous potential for screening applications. For example, it could be used to sort samples according to the strength of the phenotype (very strong=collection channel 1, strong=collection channel 2, intermediate=collection channel 3, etc.) rather than just in a digital on/off fashion. Only this way truly quantitative and mechanistic data can be obtained from downstream genetic or biochemical analyses of the sorted samples. Alternatively, multichannel sorting can be used in multiplexed assays, similar to multi-colour FACS: For a given multiplexed readout that determines the phenotypes A, B and C in parallel, the samples could be sorted for all possible combinations such as $A^+B^-C^-$, $A^-B^+C^-$, ( . . . ), $A^+B^+C^+$. However, current dielectrophoretic sorting devices do not allow to perform these steps for microfluidic droplets.

The inventors have overcome all these limitations using sorting devices that have an electrode pair not only on one side of the collection channel, but rather on both sides of the sorting junction. Furthermore, in this approach a voltage can be sent to one electrode pair at any time of the experiment, and only the target electrode pair is changed according to the sorting decision (the collection electrode pair is switched on whenever a droplet is showing a desired readout signal, while the waste electrode is switched on whenever a droplet shows a non-desired readout signal). This enables reliable sorting without the need to adjust the relative flow rates at the sorting junction and also without being sensitive to fluctuations, and furthermore enables multi-way sorting by simply placing electrode pairs next to each collection channel. As a further feature, the electrode pairs may run in parallel to the microfluidic channels, rather than being orthogonal to them as in conventional dielectrophoretic sorters. This enables an unprecedented level of control, moving droplets on "electric rails". The sorting device of the invention achieves highly reliable sorting, independently of the relative flow rates in the channels downstream of the sorting junction. Hence sorting can be performed efficiently for long times (e.g. over 20 hours), and factors causing fluctuations in the flow rates become negligible. This is particular relevant when aspirating from one outlet with a mechanical syringe pump, which always shows some pulsing behaviour. Furthermore the sorting device can be used to overcome changes in the channel resistances, either caused by droplet aggregates in the collection channel or by precipitates as frequently observed for long-term sorting of protein-rich droplets.

SUMMARY OF THE INVENTION

In a first aspect, the present invention relates to a microfluidic device comprising at least one sorting junction comprising (i) one stem channel, (ii) at least two branch channels, and (iii) an electrode pair for each branch channel.

In a second aspect, the present invention relates to a microfluidic device comprising at least one sorting junction comprising (i) one stem channel, (ii) at least two branch channels, and (iii) one electrode pair, wherein at least a part of the electrode pair runs parallel to at least a part of the stem channel up to the sorting junction, and preferably at least a part of the electrode pair also to at least a part of a branch channel.

In a third aspect, the present invention relates to the use of the microfluidic device of the first or the second aspect for sorting an object.

In a fourth aspect, the present invention relates to a method for sorting an object, comprising the steps of
 (i) feeding an object into the microfluidic device of the first aspect,
 (ii) detecting a signal emitted from the object,
 (iii) switching on one electrode pair of the at least one sorting junction of the microfluidic device of the first aspect,
 (iv) passing the object across the at least one sorting junction, whereby the object enters one branch channel depending on the signal detected.

In a fifth aspect, the present invention relates to a method for sorting an object, comprising the steps of
(i) feeding an object into the microfluidic device of the second aspect,
(ii) detecting a signal emitted from the object,
(iii) switching on the electrode pair of the at least one sorting junction of the microfluidic device,
(iv) passing the object across the at least one sorting junction,
(v) optionally switching off the electrode pair.

LEGENDS TO THE FIGURES

FIG. 1: Principle of the invention's multi-electrode droplet sorter. Flow is from left to right. A: Top view. B: Zoom-in of the sorting junction (also top view).

Figure 2:
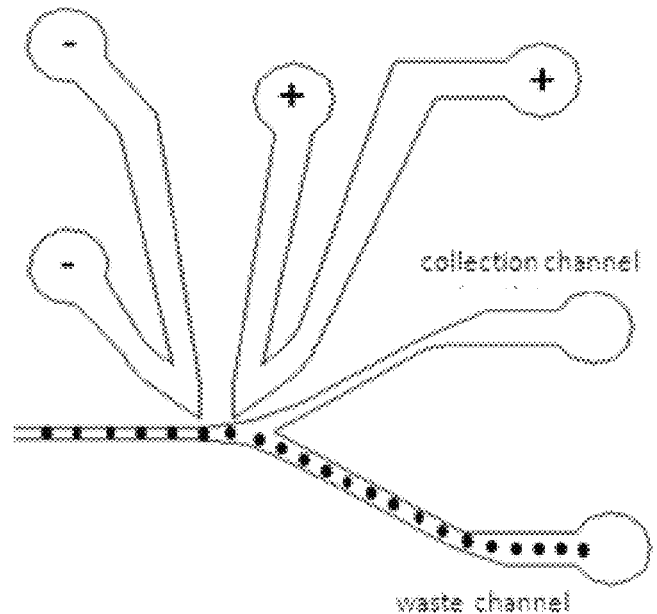
Figure 2:
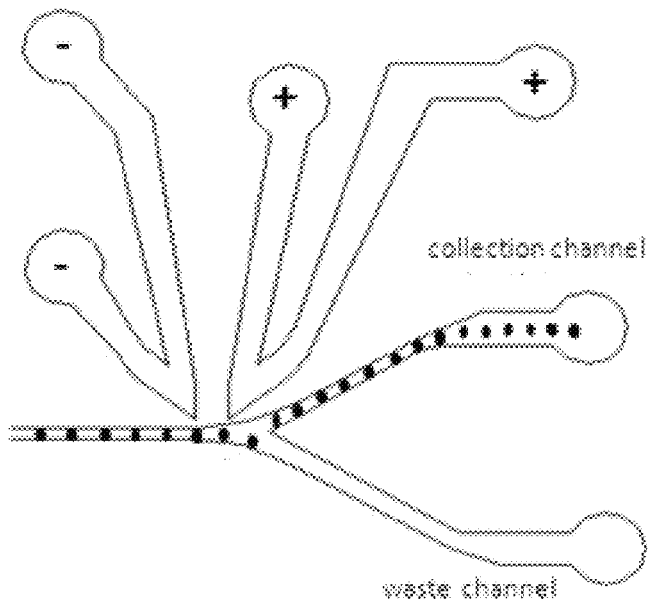

FIG. 2: Conventional dielectrophoretic droplet sorting. Flow is from left to right. This setup includes a single electrode pair on the side of one branch channel, here the collection channel. The collection channel has a higher hydrodynamic resistance than the waste channel. Arrows indicate the flow direction, dots the droplets. A: Droplet flow in the absence of an electric field. B: Droplet flow in the presence of an electric field.

Figure 3:
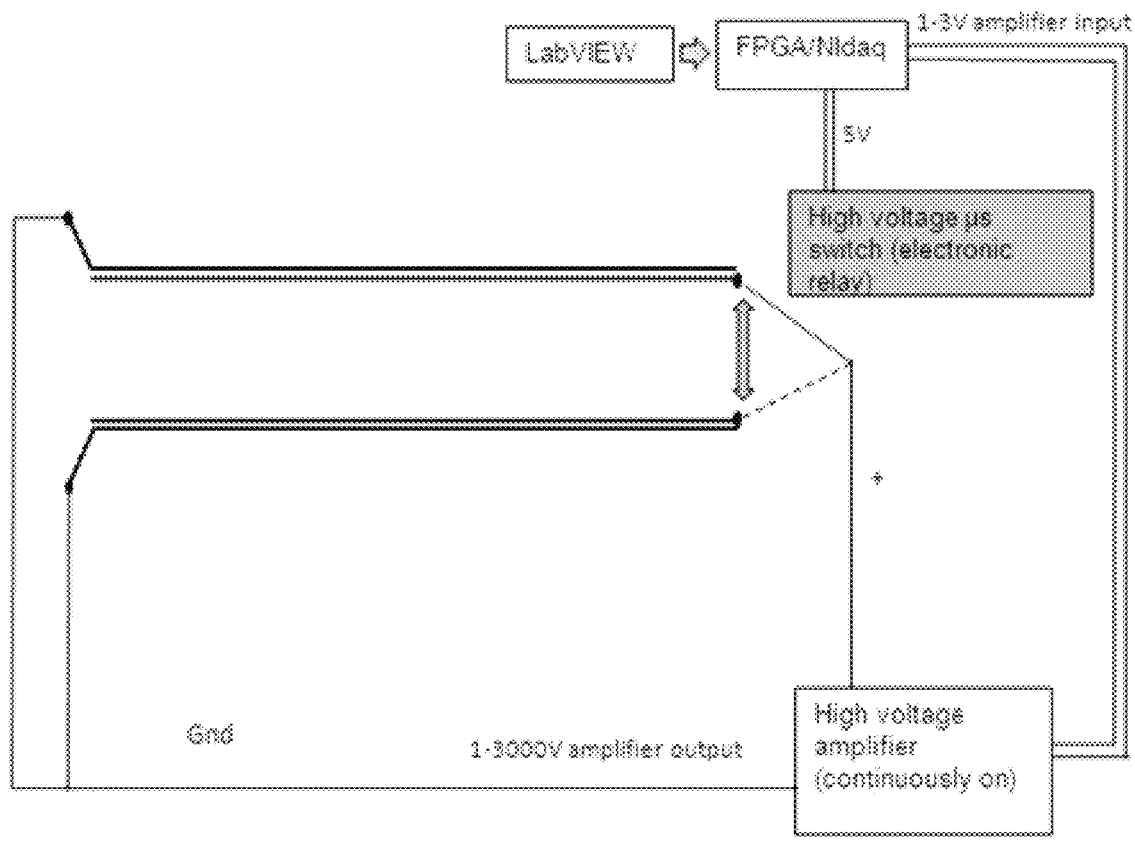

FIG. 3: Electric setup of a multi-electrode sorting device.

Figure 4:
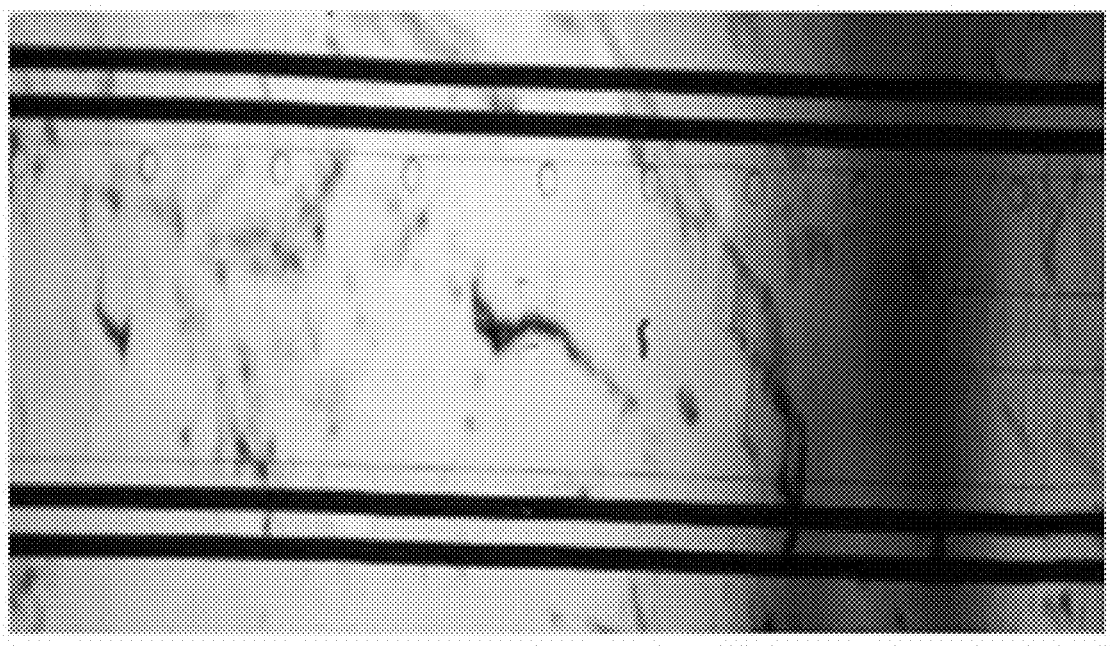
Figure 4:
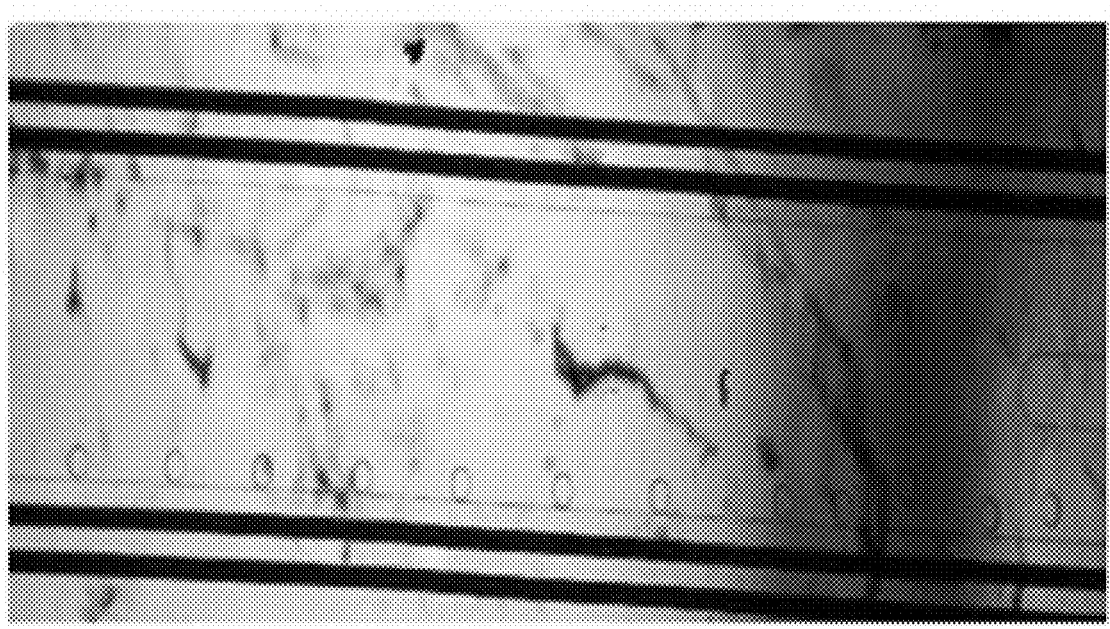

FIG. 4: Photograph of multi-electrode droplet sorting. Flow is from left to right. A: Top electrode pair on, bottom electrode pair off. The droplets flow along the top electrode pair. B: Top electrode pair off, bottom electrode pair on. The droplets flow along the bottom electrode pair. The trajectory of the droplets can be changed based on which electrodes are switched on.

Figure 5:
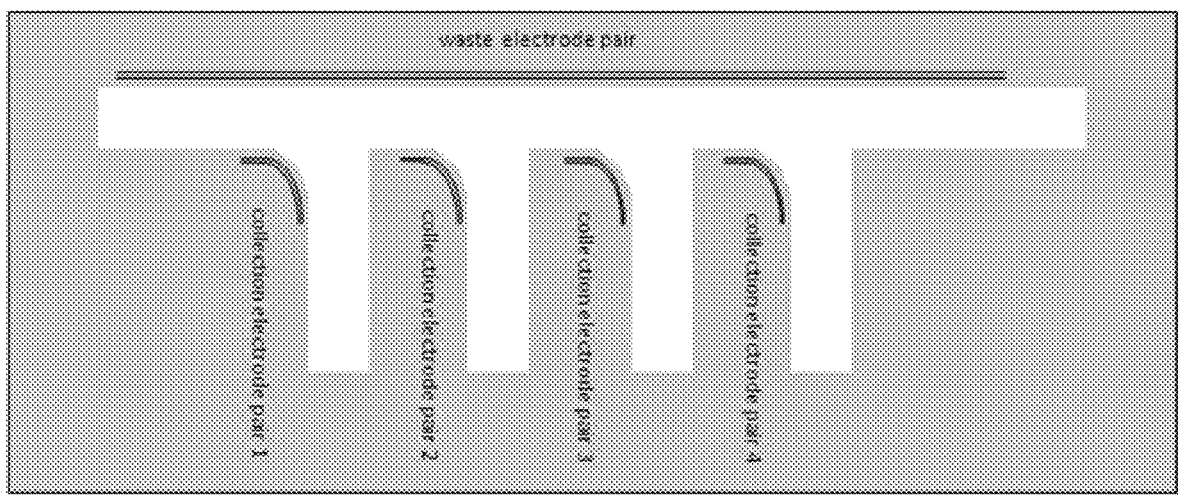

FIG. 5: Multi-electrode device for multi-way sorting. Flow is from left to right. An object can be sorted into different collection channels based on which electrode pair (e.g. 1-4) is switched on.

Figure 6:
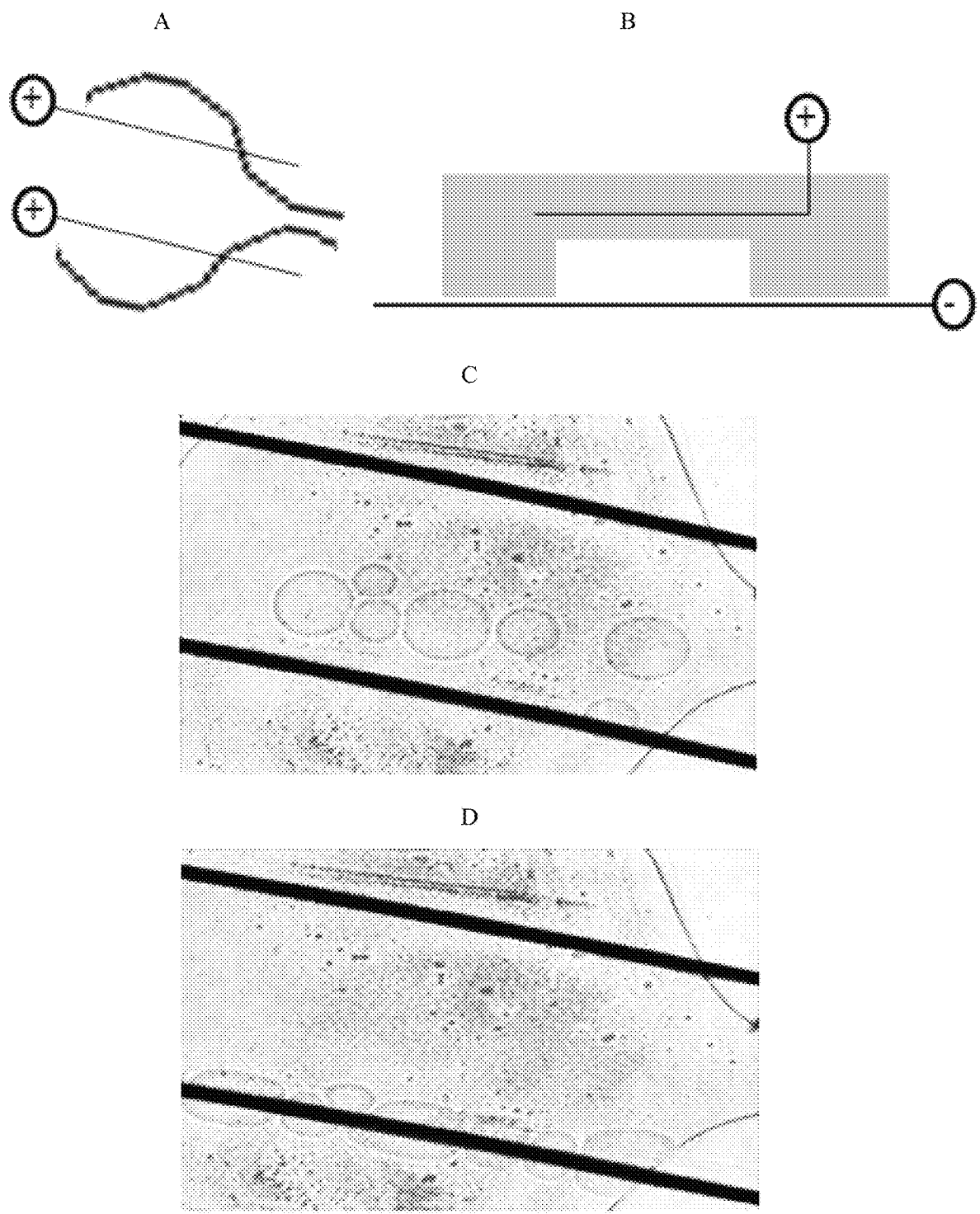

FIG. 6: Sorting device with electrodes above and below the microfluidic channel network (multilayer multi-electrode device). A: Schematic top view of the set up showing two power electrodes (the ground electrodes are below the channel structure and are not shown). B: Schematic cross section view. The power electrode (+) is above the channel (depicted in white within the grey device material), the ground electrode (−) below it. C: Photograph of the droplet flow with both power electrodes switched off. D: Photograph of the droplet flow with the top power electrode switched off and the bottom power electrode switched on. This configuration allows allocating particular positions in the X-Y dimension to the droplets. Upon applying an electrical field, all droplets align with the used electrode.

Figure 7:
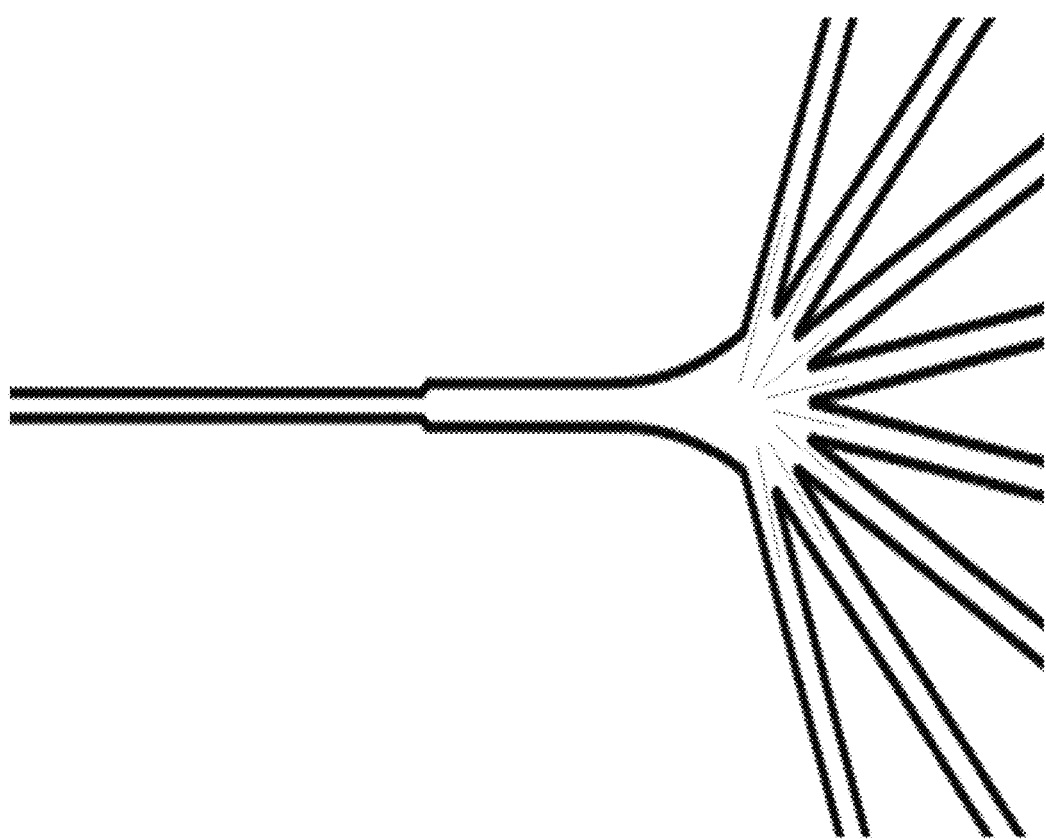

FIG. 7: 8-way sorting device with electrodes above and below the microfluidic channel network (multilayer multi-electrode device). Flow is from left to right. The 8 thin lines emerging from the sorting junction as indicated by the arrow depict the 8 power electrodes (the ground electrodes are below the channel network and are not shown) leading objects into the 8 branch channels.

Figure 8:
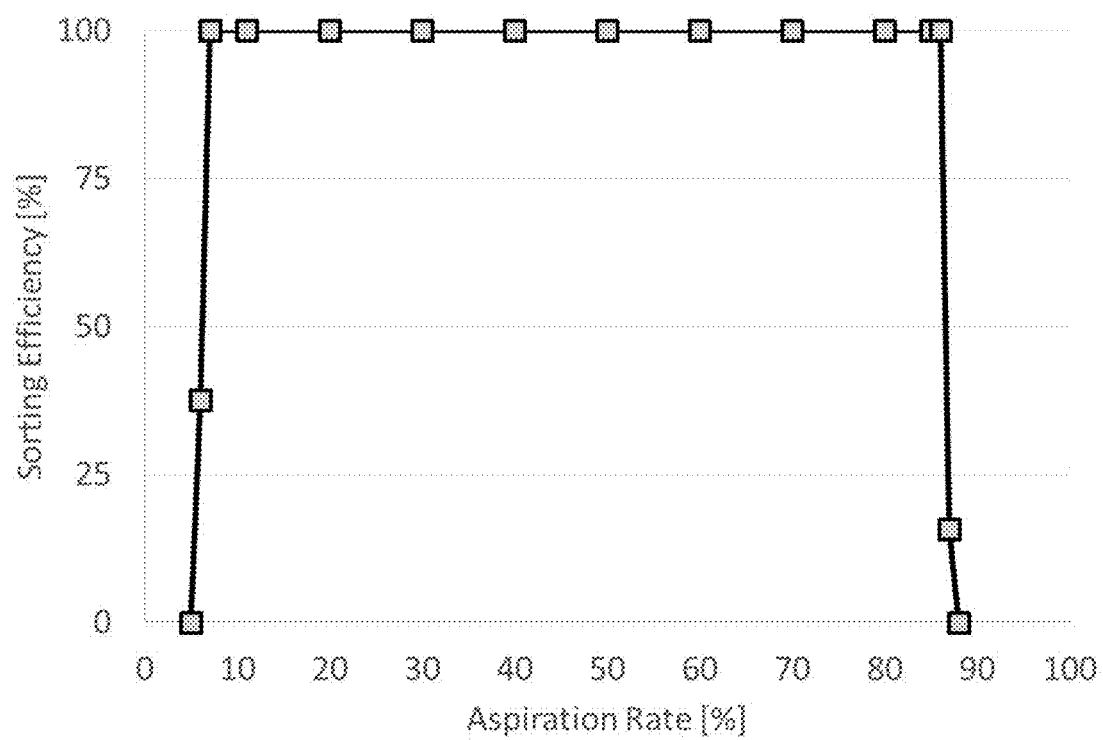

FIG. 8: Sorting efficiency at different relative flow rates in the waste and collection channels. Indicated percentages (5%-88%) of the total input flow rate were aspirated from the straight "waste" channel. Droplets containing 100 μm Alexa Fluor 488 were generated and applied to a sorting mode in which every second droplet was sorted into the collection channel. Efficiencies were determined by video analysis of more than 700 events.

DETAILED DESCRIPTION OF THE INVENTION

Before the present invention is described in detail below, it is to be understood that this invention is not limited to the particular methodology, protocols and reagents described herein as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Preferably, the terms used herein are defined as described in "A multilingual glossary of biotechnological terms: (IU-PAC Recommendations)", Leuenberger, H. G. W, Nagel, B. and Kolb', H. eds. (1995), Helvetica Chimica Acta, CH-4010 Basel, Switzerland) and in "Encyclopedia of Microfluidics and Nanofluidics", Springer Reference, Volume 1.

Several documents are cited throughout the text of this specification. Each of the documents cited herein (including all patents, patent applications, scientific publications, manufacturer's specifications, instructions etc.), whether supra or infra, is hereby incorporated by reference in its entirety. Nothing herein is to be construed as an admission that the invention is not entitled to antedate such disclosure by virtue of prior invention.

In the following, the elements of the present invention will be described. These elements are listed with specific embodiments, however, it should be understood that they may be combined in any manner and in any number to create additional embodiments. The variously described examples and preferred embodiments should not be construed to limit the present invention to only the explicitly described embodiments. This description should be understood to support and encompass embodiments which combine the explicitly described embodiments with any number of the disclosed and/or preferred elements. Furthermore, any permutations and combinations of all described elements in this application should be considered disclosed by the description of the present application unless the context indicates otherwise.

Throughout this specification and the claims which follow, unless the context requires otherwise, the word "comprise", and variations such as "comprises" and "comprising", are to be understood to imply the inclusion of a stated integer or step or group of integers or steps but not the exclusion of any other integer or step or group of integer or step. As used in this specification and the appended claims, the singular forms "a", "an", and "the" include plural referents, unless the content clearly dictates otherwise.

In a first aspect, the present invention relates to a microfluidic device comprising at least one sorting junction comprising (i) one stem channel, (ii) at least two branch channels, and (iii) an electrode pair for each branch channel.

In one embodiment, the electrode pairs are configured such that during sorting, one of the electrode pairs is switched on at any given time, or is switched on at any given time with the exception of off times for the electrode pairs of the at least one sorting junction of no more than 100 ms, preferably no more than 50 ms or more preferably no more than 10 ms.

In one embodiment, the at least one sorting junction comprises two branch channels and the stem channel is located between the electrode pairs. Preferably, also the two branch channels are located between the electrode pairs.

In another embodiment, the electrode pairs are located laterally of the stem channel and optionally the branch channels. In an alternative embodiment, the electrode pairs are located above and/or below the stem channel and optionally the branch channels. Therein, "or" means an electrode pair is above or below a channel, and "and" means one electrode of the electrode pair, e.g. the power electrode, is above a channel and the other electrode is below the channel, or one electrode of the electrode pair, e.g. the power electrode, is below a channel and the other electrode is above the channel.

In a preferred embodiment, at least a part of the electrode pairs runs parallel to at least a part of the stem channel up to the sorting junction, and preferably at least a part of each electrode pair also to at least a part of a branch channel. Preferably, the electrode pairs run parallel to at least part of the stem channel and optionally to at least part of the branch channel over a length of at least 5 µm, at least 50 µm or preferably et least 500 µm of each electrode pair.

The closest distance of an electrode pair (determined by the electrode thereof that is between the stem/branch channel and the other electrode, i.e. the one that is closer to the channel) to a stem and or branch channel is usually less than 1 mm, preferably less than 500 µm, more preferably less than 100 µm and most preferably in the range of 10-50 µm.

Generally, the electrode pair consists of a power electrode and a ground electrode. Ground electrodes may be located on the same side of a channel as power electrodes of the same pair, but they may also be located on opposing sides of the channel. Preferably, the power electrode is located between the ground electrode and the stem channel and optionally between the ground electrode and a branch channel. The inventors observed that this setup works best for sorting objects reliably.

In an embodiment for multi-way sorting, the microfluidic device comprises at least two sorting junctions in a sequential order, wherein each sorting junction comprises two branch channels, and wherein the branch channel of one sorting junction is the stem channel of the subsequent sorting junction. In this embodiment it is possible that one branch channel of one sorting junction shares an electrode pair with the branch channel of the subsequent sorting junction. It is further possible that one electrode pair is shared by one branch channel of each sorting junction. This is depicted in FIG. 5

Further, or in another embodiment for multi-way sorting, the sorting junction may comprise at least three branch channels.

Since the microfluidic device of the invention can sort objects despite different flow rates in the branch channels, it may lack a means for adjusting the relative flow rate, such as different hydrodynamic resistances of the waste and collection channel or one or more pumps aspirating flow from one or more outlets connected to one or more branch channels, at the sorting junction, in particular in the branch channels.

The microfluidic device of the first aspect may further comprise one or more of
 a detector capable of detecting a signal upstream of the at least one sorting junction, wherein the detector is directly or indirectly connected to the electrode pairs; and/or
 an aspiration means connected to a channel outlet of the microfluidic device, wherein the channel outlet receives fluid from a branch channel, and wherein the aspiration means generates flow pulses; and/or
 a multiwell plate, wherein at least one branch channel of the at least one sorting junction is connected to a well of the multiwell plate.

The microfluidic device of the first aspect can be configured for sorting comprising selecting for and against an object. It can also be configured for sorting comprising selecting only for an object. In the latter case, it is preferred that the microfluidic device is configured such that one branch channel of the at least one sorting junction leads to a waste channel (and then a waste reservoir) and such that the electrode pair of this branch channel is switched on after the object has entered a branch channel (preferably after the object has passed the electrode pair of the branch channel it entered). Accordingly, the maximum of what follows the object in the stem channel is directed towards the waste. Similarly, the microfluidic device can also be configured for sorting comprising selecting only against an object. In this embodiment, it is preferred that the microfluidic device is configured such that one branch channel of the at least one sorting junction leads to a waste channel (and then a waste reservoir) and such that the electrode pair of this branch channel is switched off after the object has entered this channel (and the electrode pair of another branch channel of the same sorting junction is switched on). This happens more preferably after the object has passed the electrode pair of the branch channel it entered. Accordingly, the maximum of what follows the object in the stem channel is diverted away from the waste.

In a second aspect, the present invention relates to a microfluidic device comprising at least one sorting junction comprising (i) one stem channel, (ii) at least two branch channels, and (iii) one electrode pair, wherein at least a part of the electrode pair runs parallel to at least a part of the stem channel up to the sorting junction, and preferably at least a part of the electrode pair also to at least a part of a branch channel.

In the microfluidic device of the second aspect, it is particularly preferred that the device is configured such that the main flow of the stem channel, e.g. at least 60%, 70%, 80% or at least 90% of the flow of the stem channel, is not directed to the branch channel that is on the same side of the sorting junction as the electrode pair, i.e. is directed to the one or more other branch channels of the at least two branch channels. For this purpose, the microfluidic device may comprise means for adjusting the relative flow rate, such as different hydrodynamic resistances of the waste and collection channel or one or more pumps aspirating flow from one or more outlets connected to one or more branch channels, at the sorting junction, in particular in the branch channels.

Preferably, the electrode pair runs parallel to at least part of the stem channel and optionally to at least part of the branch channel over a length of at least 5 µm, at least 50 µm or preferably et least 500 µm of the electrode pair.

The closest distance of an electrode pair (determined by the electrode thereof that is between the stem/branch channel and the other electrode, i.e. the one that is closer to the channel) to a stem and or branch channel is usually less than 1 mm, preferably less than 500 µm, more preferably less than 100 µm and most preferably in the range of 10-50 µm.

In another embodiment, the electrode pairs are located laterally of the stem channel and optionally the branch channels. In an alternative embodiment, the electrode pairs are located above and/or below the stem channel and optionally the branch channels. Therein, "or" means an electrode pair is above or below a channel, and "and" means one electrode of the electrode pair, e.g. the power electrode, is above a channel and the other electrode is below the channel, or one electrode of the electrode pair, e.g. the power electrode, is below a channel and the other electrode is above the channel.

In a preferred embodiment, at least a part of the electrode pair runs parallel to at least a part of the stem channel up to the sorting junction, and preferably at least a part of the electrode pair also to at least a part of a branch channel.

Generally, the electrode pair consists of a power electrode and a ground electrode. Ground electrodes may be located on the same side of a channel as power electrodes of the same pair, but they may also be located on opposing sides of the channel. Preferably, the power electrode is located between the ground electrode and the stem channel and optionally between the ground electrode and a branch channel. The inventors observed that this setup works best for sorting objects reliably.

In an embodiment for multi-way sorting, the microfluidic device comprises at least two sorting junctions in a sequential order, wherein each sorting junction comprises two branch channels, and wherein the branch channel of one sorting junction is the stem channel of the subsequent sorting junction. In this embodiment it is possible that one branch channel of one sorting junction shares an electrode pair with the branch channel of the subsequent sorting junction. It is further possible that one electrode pair is shared by one branch channel of each sorting junction. This is for the waste channel of FIG. 5.

The microfluidic device of the second aspect may further comprise one or more of
- a detector capable of detecting a signal upstream of the at least one sorting junction, wherein the detector is directly or indirectly connected to the electrode pair; and/or
- an aspiration means connected to a channel outlet of the microfluidic device, wherein the channel outlet receives fluid from a branch channel, and wherein the aspiration means generates flow pulses; and/or
- a multiwell plate, wherein at least one branch channel of the at least one sorting junction is connected to a well of the multiwell plate.

In a third aspect, the present invention relates to the use of the microfluidic device of the first or the second aspect for sorting an object.

It is of course envisaged that a plurality of objects is sorted, e.g. at least 100, 500, 1,000, 10,000 or at least 100,000. Preferably, objects are sorted for a period of time of at least 1 hour, 5 hours, 10 hours, 15 hours, or at least 20 hours. This may refer to a total time of sorting with interruptions, during which the microfluidic device, especially its channels, are not washed with a washing liquid dedicated to that purpose (i.e. having no other purpose). It may also refer to a continuous time of sorting. During such long sorting times, aggregates and/or precipitates usually form within the channels and lead to varying flow rates, which is usually undesirable, but tolerated using the microfluidic device of the invention. In one embodiment, an object is sorted that is a microfluidic droplet containing a protein solution. The protein solution is preferably rich of protein, e.g. a cell culture supernatant or a solution with a protein concentration in the range of that of cell culture supernatants. For example, the protein concentration of a protein-rich solution may be larger than 25 ng/ml, preferably larger than 50 ng/ml.

In a preferred embodiment, the microfluidic device of the first or the second aspect for sorting an object at a sorting rate of at least 50 Hz, 75 Hz, 100 Hz, 150 Hz, at least 175 Hz, at least 200 Hz or at least 240 Hz. The upper limit sorting rate can be, for each afore-mentioned minimum value, 1000 Hz, 500 Hz, 300 Hz or 250 Hz (resulting in ranges such as 50 to 500 Hz, 100 Hz to 300 Hz or 150 Hz to 250 Hz).

In a fourth aspect, the present invention relates to a method for sorting an object, comprising the steps of
(i) feeding an object into the microfluidic device of the first aspect,
(ii) detecting a signal emitted from the object,
(iii) switching on one electrode pair of the at least one sorting junction of the microfluidic device of the first aspect,
(iv) passing the object across the at least one sorting junction, whereby the object enters one branch channel depending on the signal detected.

It is of course envisaged that a plurality of objects is sorted, e.g. at least 100, 500, 1,000, 10,000 or at least 100,000.

In one embodiment, in step (ii) the intensity of a signal is measured and the object enters a branch channel depending on the intensity of the signal detected. This is particularly in a multi-way sorting setup as described herein, wherein depending on the signal intensity, the object is sorted into one of the branch channels, in particular wherein each branch channel receives objects depending on the signal intensity which is different for each branch channel.

Preferably, in step (iii), when one electrode pair of the at least one sorting junction is switched on, the other electrode pair is switched off if it is not already off.

In one embodiment, one branch channel of the at least one sorting junction ultimately leads to a waste collector and the electrode pair for this branch channel is switched on after the object has entered another branch channel of the sorting junction, preferably after the object has passed the electrode pair for the branch channel it entered.

In another embodiment, objects are sorted for a period of time as defined with respect to the third aspect.

In another embodiment, the flow resistance in the branch channels of the at least one sorting junction changes (i.e. is not constant) during sorting. This may be due to droplet aggregates or precipitates in one or in both branch channels.

In another embodiment, the object is a microfluidic droplet containing a protein solution.

In another embodiment, fluid is aspirated from at least one branch channel in a pulsing rhythm.

In yet another embodiment, the object is sorted into a well of a multiwell plate.

In a preferred embodiment, objects are sorted at a sorting rate of at least 50 Hz, 75 Hz, 100 Hz, 150 Hz, at least 175 Hz, at least 200 Hz or at least 240 Hz. The upper limit sorting rate can be, for each afore-mentioned minimum value, 1000 Hz, 500 Hz, 300 Hz or 250 Hz (resulting in ranges such as 50 to 500 Hz, 100 Hz to 300 Hz or 150 Hz to 250 Hz).

In a fifth aspect, the present invention relates to a method for sorting an object, comprising the steps of
(i) feeding an object into the microfluidic device of the second aspect,
(ii) detecting a signal emitted from the object,
(iii) switching on the electrode pair of the at least one sorting junction of the microfluidic device,
(iv) passing the object across the at least one sorting junction,
(v) optionally switching off the electrode pair.

It is of course envisaged that a plurality of objects is sorted, e.g. at least 100, 500, 1,000, 10,000 or at least 100,000.

It is evident from this, the above (fourth aspect) and the following that in step (iv), the object enters one branch channel depending on the signal detected.

In one embodiment, in step (ii) the intensity of a signal is measured and the object enters a branch channel depending on the intensity of the signal detected. This is particularly in a multi-way sorting setup as described herein, wherein depending on the signal intensity, the object is sorted into one of the branch channels.

In one embodiment, one branch channel of the at least one sorting junction ultimately leads to a waste collector and the electrode pair for this branch channel is switched on after the object has entered another branch channel of the sorting junction, preferably after the object has passed the electrode pair for the branch channel it entered.

In another embodiment, objects are sorted for a period of time as defined with respect to the third aspect.

In another embodiment, the flow resistance in the branch channels of the at least one sorting junction changes (i.e. is not constant) during sorting. This may be due to droplet aggregates or precipitates in one or in both branch channels.

In another embodiment, the object is a microfluidic droplet containing a protein solution.

In another embodiment, fluid is aspirated from at least one branch channel in a pulsing rhythm.

In yet another embodiment, the object is sorted into a well of a multiwell plate.

In a preferred embodiment, objects are sorted at a sorting rate of at least 50 Hz, 75 Hz, 100 Hz, 150 Hz, at least 175 Hz, at least 200 Hz or at least 240 Hz. The upper limit sorting rate can be, for each afore-mentioned minimum value, 1000 Hz, 500 Hz, 300 Hz or 250 Hz (resulting in ranges such as 50 to 500 Hz, 100 Hz to 300 Hz or 150 Hz to 250 Hz).

Definitions and Further Embodiments

As used herein, the term "microfluidic device" generally refers to a device through which materials, particularly fluid borne materials, such as liquids, can be transported, in some embodiments on a micro-scale, and in some embodiments on a nanoscale or even picoscale. Thus, the microfluidic devices can comprise microscale features, nanoscale features, and combinations thereof. In the context of the invention, the term also refers to a) a device that comprises a plurality of enclosed microchannel structures, each of which comprises one or more enclosed microchannels and/or microcavities, and b) that these microchannel structures are used for transporting and processing liquid aliquots, in particular objects and microfluidic droplets as described above, that are in the nano- to microliter range and may contain reactants including e.g., analytes and reagents. The liquid aliquots are typically aqueous. The transporting and processing are typically part of an analytically and/or a preparative process protocol. The number of microchannel structures in a device may be more than 1, 2, 3, 4, 5, 10, 25 or 50 and is typically below 500, for example below 100. An exemplary microfluidic device typically comprises structural or functional features dimensioned in the order of a millimeter-scale or less, which are capable of manipulating a fluid at a flow rate on the order of several hundred or even several thousand μL/hr. Typically, such features include, but are not limited to channels, fluid reservoirs, reaction chambers, mixing chambers, and separation regions. In some examples, the channels include at least one cross-sectional dimension that is in a range of from about 10 μm to about 3000 μm, preferably to about 1000 μm. The use of dimensions in this order allows the incorporation of a greater number of channels in a smaller area, and utilizes smaller volumes of fluids.

The microfluidic device is preferably a microfluidic chip. As used herein, "chip" refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as channels and wells, electrode elements, electromagnetic elements, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips of the present invention can vary considerably, e.g., from about 1 $mm^2$ to about 0.25 $m^2$. Preferably, the size of the chips is from about 4 $mm^2$ to about 50 $cm^2$ with a characteristic dimension from about 1 mm to about 5 cm. The chip surfaces may be flat, or not flat. The chips with non-flat surfaces may include channels or wells fabricated on the surfaces.

Preferably, the microfluidic device and in particular the microfluidic chip is made of an optically transparent polymer or of glass. A particularly preferred transparent polymer is poly(dimethylsiloxane) (PDMS). PDMS chips can be fabricated, for example, by soft lithography (Squires and Quake. Microfluidics: Fluid physics at the nanoliter scale. Reviews of Modern Physics, 2005, vol. 77). Other suitable polymers are, for example, Ormocomp, polymethylmethacrylate (PMMA), Sifel, cyclo-olefin copolymer (COC), polyvinylidene fluoride (PVDF) or polystyrene (PS).

The term "sorting" refers to selecting or separating an object based on its properties, preferably based on a signal it emits. How this is achieved is described above.

The term "sorting junction" refers to a channel geometry comprising a single channel referred to as stem channel herein, that branches out into at least 2, 3, 4, 5, 6, 7, 8, 9 or at least 10 single channels referred to as branch channels herein. "Single channel" refers to a section of a channel in a channel network.

The term "channel" can mean a recess or cavity formed in a material by imparting a pattern into a material or by any suitable material removing technique, or can mean a recess or cavity in combination with any suitable fluid-conducting structure mounted in the recess or cavity, such as a tube, capillary, or the like. Generally, it refers to a microchannel of a diameter of 3000 μm or less, 2000 μm or less, 1000 μm or less, preferably 900, 800, 700, 600, 500, 400, 300, 200, 150, 100, 50 μm or less, preferably the diameter is between 20 nm and 3000 μm, preferably between 20 nm and 1000 μm and more preferably between 20 nm and 100 μm. In a preferred embodiment, the channel is part of a microfluidics network. If the channel does not have a circular cross-section, the height and/or width of the channel is/are according to the sizes given for the diameter above.

The term "two-way sorting" refers to sorting objects into two branch channels depending on one or alternatively two properties of the object determining the sorting decision. For example, in the first alternative, objects with the property A are sorted into branch channel A and all other objects into branch channel B. In the second alternative, objects with the property A are sorted into branch channel A and objects with the property B are sorted into branch channel B. Further, the sorting may depend on the degree of a property (e.g.

intensity of a signal). For example, objects with degree X of property A are sorted into branch channel X and objects with degree Y of property A are sorted into branch channel Y. The term "multi-way" sorting refers to sorting objects into more than two branch channels depending on more than one property (e.g. more than one signal) of the object or on the degree of a property of the object (e.g. the intensity of a signal). This can be achieved by sequential two-way sorting decisions, or by having more than two branch channels at a sorting junction, e.g. at least 3, 4, 5, 6, 7, 8, 9 or at least 10.

The term "electrode" refers to a means that conducts an electric current and has an electric potential at the same time. It shall be understood that other means, such as wires, shall be comprised by this term as well.

An "electrode pair" consists of a power electrode (or + electrode) and of a ground electrode (or − electrode). Ground electrodes may be shared by different power electrodes (e.g. if ground electrodes are connected with each other sharing a common ground), but for the purposes of defining the invention two or more power electrodes sharing the same ground electrode are still considered different electrode pairs. The electrodes are suitable for generating a voltage of about 100 V to 5,000 V.

It is evident to the skilled person that "an" electrode pair can mean exactly one electrode pair.

It is also evident from the present disclosure that a "part" of an electrode pair is not one of the electrodes of a pair, i.e. the power or the ground electrode, but a part of both electrodes. In other words, it is a length section of both electrodes of the pair.

An electrode pair "for" a branch channel means that this electrode pair is configured such that it directs an object into this branch electrode when on. For this, it is not necessary, but it is desirable that the electrode pair runs in parallel to at least part of this branch channel. Usually it is at least located at the sorting junction at the side to which the branch channel it is for branches off from the stem channel.

"Sharing an electrode pair" refers to two or more sorting junctions sharing the same electrode pair. Typically, the shared electrode pair runs along, preferably parallel to, a sequence of branch channels of the two or more sorting junctions. This is illustrated in FIG. 5.

"Switching on" an electrode pair refers to sending a voltage to an electrode pair or to generate an electric potential with the electrode pair. It usually goes along with switching off all other electrode pairs of the same sorting junction, preferably at the same time.

The terms "lateral", "above" and "below" refer to a working position of the microfluidic device. For example, it the microfluidic device is a chip, the working position is one in which the chip lies flat on a surface with the top side up as intended. If no side is particularly intended as the top side, "above" and "below" are meant to refer to vertically opposing sides.

"Parallel" most preferably means completely parallel, i.e. with an angle of an electrode to a channel of 0°, but may also include such angles of less than 20°, preferably less than 10° and more preferably less than 5°.

The term "detecting" a signal encompasses detecting a combination of signals. Detecting a signal may also comprise measuring the intensity of a signal. The term refers in its simplest form to determining the presence or absence of the object via a signal emitted from the object. In a preferred embodiment, an object is detected via detecting a detectable label associated with the object. "Detectors" as referred to herein are well known in the art and include e.g. lights sensors, for example photomultiplier tubes, CMOS or CCD cameras, or detection electrodes. Generally, a detector is suitable for detecting an object and/or a detectable label as defined herein. In particular with respect to the detectable label, the detector is suitable for measuring the intensity of the signal of a detectable label. Thus, in a preferred embodiment, the detector detects a detectable label associated with an object and optionally the detector measures the signal of the detectable label associated with the one or more objects. If the detectable label is excitable, detecting can include an excitation step, for example with a laser light source. In a preferred embodiment, the signal is laser-induced fluorescence and the signal is detected, i.e. the amount is determined, by laser spectroscopy.

The term "object" refers to any object small enough to fit into the microfluidic channel and which can be labeled with a detectable label defined herein. Preferably, it is selected from the group consisting of a cell, a bead, a virus, a protein, a nanoparticle, and a microfluidic droplet. More preferably it is a microfluidic droplet, and most preferably it is a microfluidic droplet comprising one or more objects independently selected from the group consisting of a cell, a bead, a virus, a protein, and a nanoparticle.

A "bead" (also termed "microbead") is a uniform polymer particle with a diameter of up to 1000 μm, preferably of 0.5 to 500 μm, and with a surface to which biological entities such as cells, proteins including antibodies and/or nucleic acids as well as detectably labels as described below can bind or be coupled. The beads are usually polyethylene or polystyrene beads or beads made of gel matrices, for example coated with a protein, peptide, antibody or antigen.

The term "nanoparticle" used herein refers to an object having a diameter of from about 1 to 1000 nm, preferably 1 to 100 nm. Components of the nanoparticle may include metal such as gold, silver, copper, aluminum, nickel, palladium, platinum, alloys thereof, a semiconductor material such as CdSe, CdS, InAs, InP, or core/shell structures thereof, or organic particles such as particles made from organic polymer, lipids, sugars, or other organic materials, e.g. polystyrene, latex, acrylate, or polypeptide. Such organic particles may optionally contain some inorganic material; however, the amount of inorganic material is less than 50%, less than 25%, less than 10%, less than 5%, or less than 1%.

The term "microfluidic droplet" refers to an aqueous microcompartment of a certain size that encapsulates an aqueous liquid. The size of the microfluidic droplet is usually expressed as the diameter of the droplet when in a spherical shape. The diameter is generally between 5 and 400 μm, and preferably between 20 and 350 μm, between 20 and 300 μm, between 20 and 250 inn, between 20 and 200 μm or between 30 and 100 μm or between 60 and 120 μm (wherein each narrower range is preferred to the foregoing broader ranges and "between" includes the values mentioned). In a preferred embodiment, the diameter of the microfluidic droplet is between 2 and 20 times the diameter of the largest object in the droplet, preferably between 3 and 18 times, between 4 and 16 times, or between 5 and 14 times or between 6 and 12 times (wherein each narrower range is preferred to the foregoing broader ranges and "between" includes the values mentioned). Preferably, the diameter of the droplet is defined by both the above absolute and relative parameters. For example, the diameter is (i) between 5 and 400 μm, and preferably between 20 and 350 μm, between 20 and 300 μm, between 20 and 250 μm, between 20 and 200 μm or between 30 and 100 μm and between 2 and 20 times the diameter of the largest object in the droplet, (ii) between 5 and 400 μm, and preferably between 20 and 350 μm, between 20 and 300 µm, between 20 and 250 µm, between 20 and 200 µm or between 30 and 100 µm and between 4 and 16 times the diameter of the largest object in the droplet, or (iii) between 5 and 400 µm, and preferably between 20 and 350 µm, between 20 and 300 µm, between 20 and 250 µm, between 20 and 200 µm or between 30 and 100 µm and between 6 and 12 times the diameter of the largest object in the droplet.

Alternatively, the size of the microfluidic droplet can also be defined by volume. For example, it is usually less than 1 microlitre (µl). Preferably, it is less than 500 nanolitres (nl), less than 250, less than 150, less than 100 or less than 50 nl. In a preferred embodiment, it is between 0.01 and 150 nl, preferably between 0.01 and 125 nl, between 0.01 and 100 nl, between 0.01 and 80 nl, or between 0.01 and 4 nl (wherein each narrower range is preferred to the foregoing broader ranges and "between" includes the values mentioned).

In a preferred embodiment, the object comprises (i.e. is attached to an object or surrounds, the latter in particular if the object is a cell or a microfluidic droplet) a detectable label. The term "detectable label" (or "marker" or "tag") as used herein refers to any kind of substance which is able to indicate the presence of the object. The detectable label can be a substance that is linked to or introduced or incorporated into the substance to be detected. Preferred is a detectable label suitable for allowing for detection and optionally also quantification, e.g. a detectable label emitting a detectable and preferably measurable signal, preferably a light signal. Examples of suitable labels include a dye, a fluorophore, a fluorescent nanoparticle (e.g. quantum dot or lipidot), a chromophore, a radiolabel, a metal colloid, an enzyme (e.g. alkaline phosphatase, luciferase, beta-galactosidase or horseradish peroxidase), or a chemiluminescent or bioluminescent molecule. Particularly preferred are protein tags whose peptide sequences may be genetically grafted into or onto a recombinant protein. Protein tags preferably are fluorescence tags. Fluorescence tags are used to give visual readout on a protein. GFP and its variants (e.g. mutant GFPs having a different fluorescent spectrum) and RFP and its variants (e.g. mutant RFPs having a different fluorescent spectrum) are the most commonly used fluorescence tags. More advanced applications of GFP/RFP include using it as a folding reporter (fluorescent if folded, colorless if not). Further examples of fluorophores include fluorescein, rhodamine, sulfoindocyanine dye Cy5, cascade blue, alexa fluor 488 or alexa fluor 594. Thus, the phrase "signal emitted from the object" usually refers to a signal emitted from the detectable label the object comprises.

An "aspiration means generating flow pulses" or "aspirating in a pulsing rhythm" means that fluid is aspirated not with a force constant over time, but with a varying force. This creates a varying flow-rate, i.e. "pulses" in the channel. For example, this is caused by an aspiration means that is a mechanical syringe pump or a peristaltic pump.

The term "multiwell plate", also known as microplate, microwell plate or microtiter plate, refers to a flat plate with multiple wells used as small test tubes. A multiwell plate typically has 6, 24, 96, 384, 1536, 3456 or 9600 wells arranged in a 2:3 rectangular matrix.

The phrase "passing an object" usually refers to a passive flow of the object in a channel.

The term "flow resistance" refers to the channel resistance or the hydrodynamic resistance in a channel.

The invention is described by way of the following examples which are to be construed as merely illustrative and not limitative of the scope of the invention.

Example 1

A preferred design of the sorting device is shown in FIG. 1. This device uses electrodes running as straight lines in parallel to the channel walls. For sorting, the waste electrode pair is switched on unless a droplet with the desired properties passes by. In this case, the waste electrode pair is switched off and the collection electrode pair is switched on for a time interval sufficiently long to guide the desired droplet into the collection channel. Immediately afterwards, all electrodes are switched back to the initial configuration. The electrode pairs are passing the sorting divider, thus controlling the droplets not only until the sorting junction, but rather all time until they have irreversibly entered the desired channel. An exemplary electric setup for this device is shown in FIG. 3. Photographs of droplets moving along the electrode that is switched on are shown in FIG. 4.

To further demonstrate the feasibility of this approach 100 µm droplets containing 100 µM Alexa Fluor 488 were sorted. Two way sorting was performed by generating 100 µm droplets containing 100 µM FITC directly on the sorting chip. The aqueous phase and QX 200 (Biorad droplet generation oil) were injected into the flow-focusing geometry at a rate of 20-200 µl/h and 900-1250 µl/h and the resulting droplets were spaced out by injecting Novec 7500 (3M) at a rate of 400 µl/h further downstream. To evaluate the flow rate dependency, liquid was aspirated from the waste outlet corresponding to 5, 6, 7, 11, 20, 30, 40, 50, 60, 70, 80, 85, 86, 87, 88 and 90% of the total flow rate (1320 µl/h). The applied input voltage (1.5 kV) for the electrodes and the on-time of the sorting electrode (10 ms) was constant among all experiments. Every second droplet was test-sorted, to illustrate that manipulation on the level of a single droplet is possible, and because this setup stresses the switch maximally.

More importantly, the sorting efficiency is largely independent of the relative flow rates downstream of the sorting junction: by connecting a syringe aspirating fluid from one of the outlets (while leaving the other outlet unaffected), different fractions of the overall flow were withdrawn and the sorting efficiency was monitored (sorting every second droplet) by high speed imaging. Over a range from roughly 20:80 to 80:20 (in terms of the relative flow rates in the waste and collection channel) the sorting efficiency remained completely unaffected at ~100% (see details in Table 1A and FIG. 8), without changing any other sorting parameters (e.g. pulse amplitude and/or duration). In contrast, sorting with just one electrode pair (mimicking a conventional setup) worked when constantly aspirating 80% of the relative flow from the waste outlet, but failed when changing the relative flow rates by more than 5%. Throughputs around 160 Hz were achieved, which is roughly three times higher than what could be achieved for droplets of that size, using a conventional sorting setup (El Debs et al., Proc Natl Acad Sci USA, 2012. 109(29): p. 11570-5). In further experiments, even a throughput of about 240 Hz could achieved, which is approximately 5-fold higher.

TABLE 1A

Performance and efficiency of two-way sorting (as determined by analyzing high-speed movies). To analyse the sorting efficiency, the electrodes were triggered only for every second, third or fifth droplet (1:2, 1:3 and 1:5 sorting modes at constant relative flow rates, aspirating 50% of the total flow from the waste outlet).

| Sorting ratio | Total number of analyzed droplets | Sorting Rate [Hz] | Efficiency [%] |
|---|---|---|---|
| 1:5 | ~778 | 157 | 100 |
| 1:3 | ~802 | 161 | 100 |
| 1:2 | ~761 | 153 | 100 |

The setup also showed much higher robustness when perturbing the system in a real world context. While performing sorting experiments with one and two electrode pairs at the sorting junction (at flow rates which usually allow 100% efficiency in both systems; 80:20 for one and 50:50 for two electrode pairs), the inventors gently flicked the tubing connected to the collection outlet. This procedure mimics a perturbation that occurs frequently in long-term biological screens, such as moving the tubing between different collection tubes (e.g. to avoid a single mistake that can ruin an entire screen of valuable samples or when changing sorting gates). For each experiment, the tubing was gently flicked six times within six seconds and the entire process was recorded using high-speed imaging. Furthermore, each experiment was repeated three times to obtain high statistical confidence. While for the single electrode pair setup (one pair per junctions as in the prior art) the perturbation decreased the sorting efficiency on average to 92.2%, the two electrode setup (one pair per branch channel) allowed 99.4% efficiency (analyzing more than 2600 sorting events in both cases), even under such difficult conditions. See Table 1B. These values correspond to a 13-fold reduced number of false positives. The utility of the setup of the invention was confirmed by long-term sorting for over 5 hours at about 65 Hz, during which not a single sorting error was detected.

TABLE 1B

Sorting efficiency while flicking the tubing connected to the outlets. On average, the sorting throughput was ~110 Hz and more than 600 sorting events were analysed per experiment

| Experiment | Efficiency when using one electrode pair per junction [%] | Efficiency when using two electrode pairs per junction (one electrode pair per branch channel) [%] |
|---|---|---|
| 1 | 92.6 | 99.8 |
| 2 | 85.7 | 100 |
| 3 | 97.5 | 99.4 |
| 4 | 92.9 | 98.4 |

Example 2

The working principle of the design of Example 1 can be scaled up for multi-way sorting, as shown in FIG. 5. This figure depicts a sequential two-way sorting. The principle can also be used to connect different collection channels to different wells of a multiwell plate, hence enabling further downstream processing (sequencing, biochemical analyses) of selected samples in a robotic fashion. To demonstrate the feasibility of multi-way sorting, a sorting module in which four channels sequentially branch off from the waste channel according to FIG. 5 was designed. Each of these collection channels has its own electrode pair running in parallel to the channel wall. To simplify the wiring, all connection points were spaced out so that they fit to standard 2.54 mm pin headers and plugs. Then droplets containing 100 μM Cascade Blue, Alexa Fluor 488 or Alexa Fluor 594 were produced and sorted using a triple-laser setup (Hu et al., Lab on a Chip. 2015; 15(20):3989-3993). After determining the optimal pulse durations and -delays (the further downstream a particular collection channel is located the longer the pulse delay; see details in Table 2) a reinjected emulsion containing the different droplet populations was sorted. The droplets were reinjected with a rate of 5 μl/h by a Hamilton syringe (250 μl). To achieve sufficient droplet spacing, QX200 was injected into the flow focusing module at a flow rate of 100 μl/h. At the single inlet geometry further downstream a mixture of 50% Novec 7500 and 50% QX200 was injected at a flow rate of 500 μl/h. To achieve optimal performance, a syringe was connected to the waste outlet aspirating at a rate of 250 μl/h. Based on different distances from the detection point, the following delays were implemented before actuating the electrode pairs: 260 ms (first electrode pair), 370 ms (second electrode pair) and 480 ms (third electrode pair). The input voltage was 1.25 kV and the pulse duration for switching electrode pairs was 20 ms. Sorting efficiency was monitored by high speed-imaging, as well as by analyzing the contents of the different collection tubes by fluorescence microscopy. Overall, a throughput of ~3 Hz at >90% efficiency (averaged over the three sorting channels) was achieved.

TABLE 2

Performance and efficiency of four-way sorting (as determined by analyzing high-speed movies and fluorescence microscopy images of sorted fractions)

| Droplet content | Sorting channel | Sorting delay [ms] | Sorting Rate [Hz] | Total number of analysed droplets (by fluorescence microscopy) | Efficiency [%] |
|---|---|---|---|---|---|
| Alexa 594 | #1 | 260 | 3 | 274 | 84.5 |
| Alexa 488 | #2 | 370 |  | 504 | 97.4 |
| Cascade Blue | #3 | 480 |  | 210 | 92.9 |

The inventors then performed an experiment to confirm the suitability for multi-way long-term sorting shown by the above proof-of-principle, by determining the long-term sorting efficiency based on subsequent fluorescence microscopy analysis of the sorted fractions. They generated droplets containing cascade blue (CB), Alexa 488, or Alexa 594, reinjected the mixed emulsion into the sorting device and sorted unattended over 13 hours. During this time, an overall throughput of 3 Hz at ~90% efficiency (average value based on microscopic analysis of all three sorted fractions) was achieved. This long-term efficiency clearly confirms the suitability of the system, not only for short proof-of-principle experiments, but also for real screening campaigns.

For multi-way sorting, a sorting junction can have more than two branch channels at a sorting junction (e.g. at least 3, 4, 5, 6, 7, 8, 9 or at least 10). Such a star-like geometry does not require long pulse delays and hence allows higher throughput. This would also allow the efficiency of the multi-way sorting device to be further increased, as a star-like geometry can operate without or very short sorting delays (similar to the ~100% efficient 2-way sorting). In this geometry, one could place electrode pairs above or below the sorting channels. This would even improve the precise control of the trajectory of droplets along different paths within a single channel.

Example 3

In an alternative design, electrodes can also be placed above and below the microfluidic channel, either as pairs or as individual power- and ground electrodes, as shown in FIG. 6. In the configuration of FIG. 6, the microfluidic channel is hence located between the positive and the ground electrodes. An advantage of placing the electrodes above and/or below the channel is the fact that the exact droplet trajectory can be pre-determined: whenever applying an electric signal, the droplets will align exactly along the electrode/electrode pair thus enabling to precisely allocate a particular position in the X-Y dimension. This also enables multi-way sorting, when using several electrodes or electrode pairs branching off into different directions of the microfluidic channel network, as shown in FIG. 7.

The invention claimed is:

1. A method for sorting an object, comprising the steps of
   (i) feeding an object into the microfluidic device comprising at least one sorting junction comprising (i) one stem channel, (ii) at least two branch channels, and (iii) an electrode pair,
   (ii) detecting a signal emitted from the object,
   (iii) switching on the electrode pair of the at least one sorting junction of the microfluidic device,
   (iv) passing the object across the at least one sorting junction, whereby the object enters one branch channel depending on the signal detected,
   wherein the electrode pair consists of a power electrode and a ground electrode, and wherein the power electrode of the electrode pair is located between the ground electrode and the stem channel and optionally a branch channel of the at least two branch channels.

2. The method of claim 1, wherein the electrode pair is located laterally of the stem channel and the branch channels.

3. The method of claim 1, wherein the electrode pair is located above or below the stem channel and the branch channels.

4. The method of claim 1, wherein at least a length section of both the power electrode and of the ground electrode of the electrode pair runs parallel to at least a part of the one stem channel up to and along at least a part of one of the at least two branch channels.

5. The method of claim 1, wherein the microfluidic device comprises at least two sorting junctions in a sequential order, wherein each sorting junction comprises two branch channels, and wherein the branch channel of one sorting junction is the stem channel of the subsequent sorting junction.

6. The method of claim 1, comprising one or more of
   a detector capable of detecting a signal upstream of the at least one sorting junction, wherein the detector is directly or indirectly connected to the electrode pair; and/or
   an aspiration means connected to a channel outlet of the microfluidic device, wherein the channel outlet receives fluid from a branch channel, and wherein the aspiration means generates flow pulses; and/or
   a multiwell plate, wherein at least one branch channel of the at least one sorting junction is connected to a well of the multiwell plate.

7. The method of claim 1, wherein
   one branch channel of the at least one sorting junction ultimately leads to a waste collector and wherein the electrode pair for this branch channel is switched on after the object has entered another branch channel of the sorting junction; and/or
   objects are sorted for at least 1 hour; and/or
   wherein flow resistance in the branch channels of the at least one sorting junction changes during sorting; and/or
   wherein the object is a microfluidic droplet containing a protein solution; and/or
   wherein fluid is aspirated from at least one branch channel in a pulsing rhythm; and/or
   wherein the object is sorted into a well of a multiwell plate.

8. The method of claim 7, wherein a collection electrode pair is switched on whenever a droplet is showing a desired readout signal, while the and a waste electrode is switched on whenever a droplet shows a non-desired readout signal, wherein switching on or off is after a specific time delay after detecting the desired readout signal.

9. The method of claim 8, wherein the time delay is calculated from the distance between the detection location and the sorting junction and the flow velocity at (or close to) the detection location.

10. The method of claim 1, wherein the microfluidic device comprises one of said electrode pair for each branch channel, wherein the stem channel is located between the electrode pairs, and wherein each of said electrode pairs is configured such that it directs an object into its branch channel.

11. The method of claim 1, wherein the at least one sorting junction comprises an electrode pair for each branch channel, and wherein in step (iii) one electrode pair of the at least one sorting junction of the microfluidic device is switched on.

12. A method for sorting an object, comprising:
   (i) feeding an object into the microfluidic device comprising at least one sorting junction comprising (i) one stem channel, (ii) at least two branch channels, and (iii) an electrode pair,
   (ii) detecting a signal emitted from the object,
   (iii) switching on the electrode pair of the at least one sorting junction of the microfluidic device,
   (iv) passing the object across the at least one sorting junction, whereby the object enters one branch channel depending on the signal detected,
   wherein at least a length section of both electrodes of the electrode pair runs parallel to at least a part of the one stem channel up to and along at least a part of one of the at least two branch channels.

13. The method of claim 12, wherein the electrode pair is located laterally of the stem channel and the branch channels; or wherein the stem channel is located between electrodes of the electrode pair.

14. The method of claim 12, wherein the electrode pair is located above or below the stem channel and the at least two branch channels.

15. The method of claim 12, wherein the at least one sorting junction comprises an electrode pair for each branch channel, and wherein in step (iii) one electrode pair of the at least one sorting junction of the microfluidic device is switched on.

16. The method of claim 12, comprising one or more of
- a detector capable of detecting a signal upstream of the at least one sorting junction, wherein the detector is directly or indirectly connected to the electrode pair; and/or
- an aspiration means connected to a channel outlet of the microfluidic device, wherein the channel outlet receives fluid from a branch channel, and wherein the aspiration means generates flow pulses; and/or
- a multiwell plate, wherein at least one branch channel of the at least one sorting junction is connected to a well of the multiwell plate.

17. The method of claim 12, wherein
- one branch channel of the at least one sorting junction ultimately leads to a waste collector and wherein the electrode pair for this branch channel is switched on after the object has entered another branch channel of the sorting junction; and/or
- objects are sorted for at least 1 hour; and/or
- wherein flow resistance in the branch channels of the at least one sorting junction changes during sorting; and/or
- wherein the object is a microfluidic droplet containing a protein solution; and/or
- wherein fluid is aspirated from at least one branch channel in a pulsing rhythm; and/or
- wherein the object is sorted into a well of a multiwell plate.

18. The method of claim 17, wherein a collection electrode pair is switched on whenever a droplet is showing a desired readout signal, and a waste electrode is switched on whenever a droplet shows a non-desired readout signal, wherein switching on or off is after a specific time delay after detecting the desired readout signal.

19. The method of claim 18, wherein the time delay is calculated from the distance between the detection location and the sorting junction and the flow velocity at (or close to) the detection location.

20. The method of claim 12, wherein the microfluidic device comprises one of said electrode pair for each branch channel, wherein the stem channel is located between the electrode pairs, and wherein each of said electrode pairs is configured such that it directs an object into its branch channel.

\* \* \* \* \*